(12) United States Patent
Daly, Jr. et al.

(10) Patent No.: US 7,788,423 B2
(45) Date of Patent: \*Aug. 31, 2010

(54) METHOD AND APPARATUS FOR INVALIDATING CACHE LINES DURING DIRECT MEMORY ACCESS (DMA) WRITE OPERATIONS

(75) Inventors: George W. Daly, Jr., Austin, TX (US); James S. Fields, Jr., Austin, TX (US)

(73) Assignee: International Business Machines Corporation, Armonk, NY (US)

( \* ) Notice: Subject to any disclaimer, the term of this patent is extended or adjusted under 35 U.S.C. 154(b) by 0 days.

This patent is subject to a terminal disclaimer.

(21) Appl. No.: 12/187,094

(22) Filed: Aug. 6, 2008

(65) Prior Publication Data

US 2008/0294807 A1 Nov. 27, 2008

Related U.S. Application Data

(63) Continuation of application No. 11/054,183, filed on Feb. 9, 2005, now Pat. No. 7,451,248.

(51) Int. Cl.
*G06F 13/00* (2006.01)

(52) U.S. Cl. ................. 710/22; 710/7; 710/26; 711/3; 711/117; 711/119; 711/141; 711/146

(58) Field of Classification Search ............... 710/22, 710/7, 20, 26; 711/3, 117–119, 127–129, 711/141, 146
See application file for complete search history.

(56) References Cited

U.S. PATENT DOCUMENTS

| 5,802,576 | A  | * | 9/1998 | Tzeng et al. ............. 711/146 |
| 6,275,909 | B1 | * | 8/2001 | Arimilli et al. ........... 711/146 |
| 6,535,958 | B1 | * | 3/2003 | Fuoco et al. ............. 711/122 |
| 6,748,463 | B1 | * | 6/2004 | Tsuboi et al. ............. 710/22 |
| 2004/0158681 | A1 | * | 8/2004 | Hooker ................... 711/143 |

\* cited by examiner

*Primary Examiner*—Eron J Sorrell
(74) *Attorney, Agent, or Firm*—Dillon & Yudell LLP

(57) ABSTRACT

A method and apparatus for invalidating cache lines during direct memory access (DMA) write operations are disclosed. Initially, a multi-cache line DMA request is issued by a peripheral device. The multi-cache line DMA request is snooped by a cache memory. A determination is then made as to whether or not the cache memory includes a copy of data stored in the system memory locations to which the multi-cache line DMA request are directed. In response to a determination that the cache memory includes a copy of data stored in the system memory locations to which the multi-cache line DMA request are directed, multiple cache lines within the cache memory are consecutively invalidated.

8 Claims, 5 Drawing Sheets

METHOD AND APPARATUS FOR INVALIDATING CACHE LINES DURING DIRECT MEMORY ACCESS (DMA) WRITE OPERATIONS

PRIORITY CLAIM

The present application is a continuation of U.S. patent application Ser. No. 11/054,183, filed on Feb. 9, 2005, entitled "Method and Apparatus for Invalidating Cache Lines During Direct Memory Access (DMA) Write Operations," which is incorporated herein by reference.

BACKGROUND OF THE INVENTION

1. Technical Field

The present invention relates to direct memory access (DMA) in general, and, in particular, to a method and apparatus for performing DMA write operations. Still more particularly, the present invention relates to a method and apparatus for invalidating cache lines during a DMA Write operation by a Peripheral Component Interconnect device.

2. Description of Related Art

Peripheral Component Interconnect (PCI) bus technology uses memory mapping techniques for performing input/output (I/O) operations and DMA operations. In a data processing system that is capable of handling PCI devices, a range of addresses called PCI address space is allocated within a system memory for all the PCI devices associated with the data processing system. Within the PCI address space, there is a region reserved by the operating system for programmable I/O operations that are performed by a processor to read or change the contents of PCI device registers within the PCI devices. In addition, a separate region is allocated within the PCI address space by the operating system for DMA accesses to the system memory by the PCI devices. The allocated addresses are dynamically mapped to a section of the system memory. Each of the PCI device can use the mapped addresses to perform DMA Read or Write operations by directly reading and writing in the PCI address space with the mapped addresses.

DMA Write operations from each of the PCI devices must be performed in a specific order as observed by any potential data consumer within the data processing system. Because the location of a DMA Write operation may have data that are shared by a cache memory of a processor, in order to maintain correct ordering, a DMA Write operation must invalidate any copies of the data from all cache memories within the data processing system before completing the DMA Write operation. In fact, the completion must occur before any subsequent DMA Write operations from the same PCI device can become visible to any data consumer; otherwise, ordering rules will be violated.

In order to sustain full DMA Write throughput, the data processing system must balance between the amount of time to resolve cache coherence and the amount of data transferred per DMA Write request. Typically, as a data processing system becomes larger, the time required to resolve cache coherence also increases, which effectively limits the bandwidth that a PCI device is able to achieve in the data processing system. One method of improving the bandwidth is to design the data processing system with a longer cache line such that more data can be invalidated per cache line invalidation request. However, there are also drawbacks associated with a relatively long cache line length. For example, an entire cache line's worth of data needs to be transferred even when only a small portion of the cache line contains the required data, which effectively leads to a reduction in bus bandwidth. A longer cache line length also increases the likelihood of false sharing of data within the same cache line by multiple processors.

The present disclosure provides an improved method and apparatus for invalidating cache lines during a DMA Write operation by a PCI device.

SUMMARY OF THE INVENTION

In accordance with a preferred embodiment of the present invention, a multi-cache line DMA request initially issued by a peripheral device. The multi-cache line DMA request is snooped by a cache memory. A determination is made as to whether or not the cache memory includes a copy of data stored in the system memory locations to which the multi-cache line DMA request are directed. In response to a determination that the cache memory includes a copy of data stored in the system memory locations to which the multi-cache line DMA request are directed, multiple cache lines within the cache memory are consecutively invalidated.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
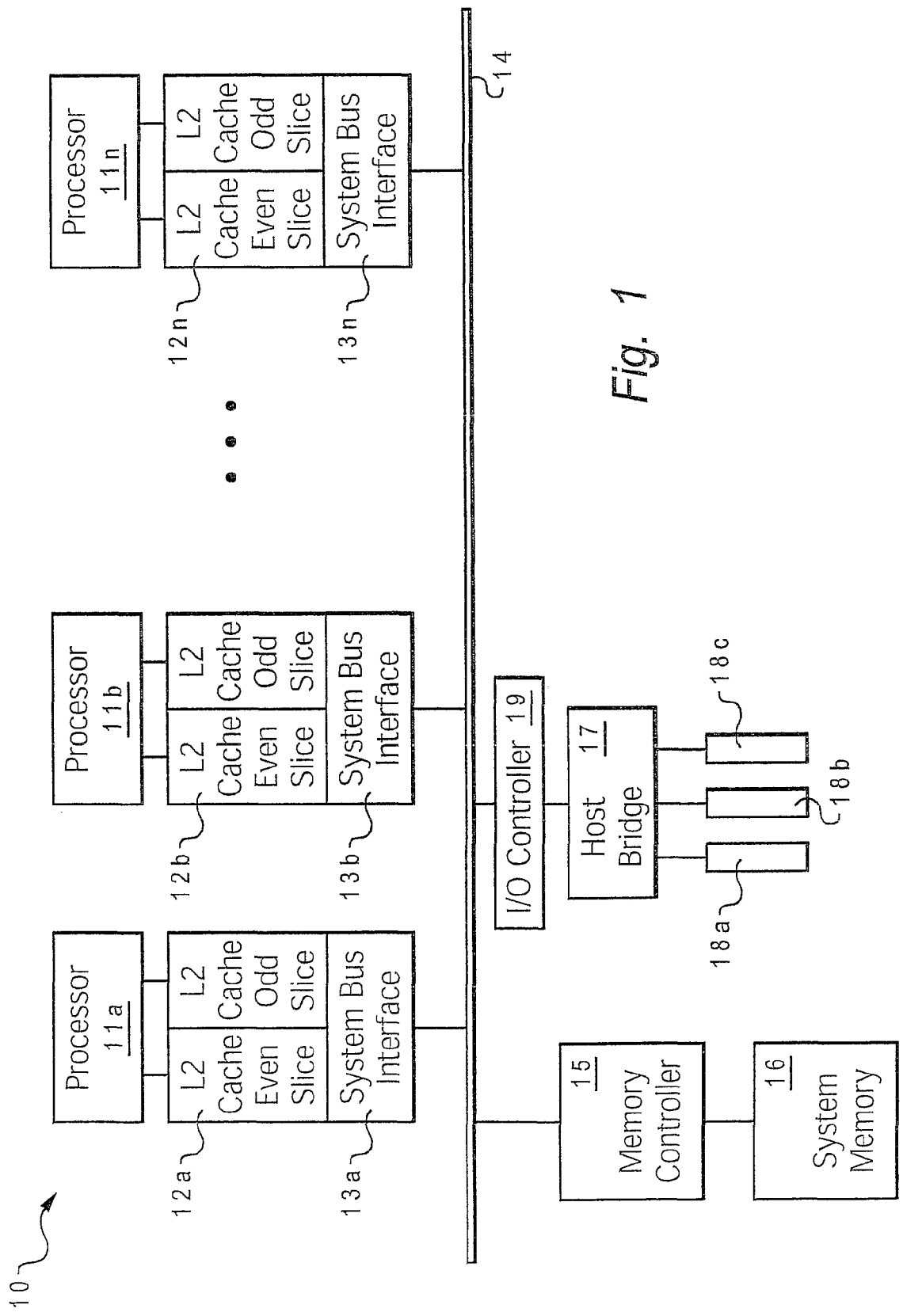
FIG. 1 is a block diagram of a multiprocessor system in which a preferred embodiment of the present invention can be implemented.

Referring now to the drawings and in particular to FIG. 1, there is depicted a block diagram of a multiprocessor system in which a preferred embodiment of the present invention may be implemented. As shown, a multiprocessor system 10 includes processors 11a-11n. Each of processors 11a-11n contains a level 1 (L1) cache memory (not shown). Each of processors 11a-11n is also associated with one of level 2 (L2) cache memories 12a-12n, respectively. For the present embodiment, each of L2 cache memories 12a-12n is organized as two slices, namely, an even slice and an odd slice. L2 cache memories 12a-12n are coupled to an interconnect 14 via a respective one of system bus interfaces 13a-13n. A system memory 16 is connected to interconnect 14 via a memory controller 15.

Multi-processor system 10 also includes Peripheral Component Interconnect (PCI) adapters 18a-18c coupled to interconnect 14 via a PCI host bridge 17 and an input/output (I/O) controller 19. I/O controller 19 is provided with a direct memory access (DMA) controller capability. PCI host bridge 17 provides an address translation function between a PCI address space and a system memory address space, which is commonly referred to as a translation control entry (TCE) translation. PCI host bridge 17 and PCI adapters 18a-18c can support a variety of I/O devices that are conformed to the PCI standard. Details of the PCI standard can be found in PCI Local Bus Specification, Revision 2.2, dated Dec. 18, 1998.

Multiprocessor system 10 supports DMA transfers from a PCI device to a system memory. A PCI address space is allocated within system memory 16 for all PCI devices connected to PCI adapters 18a-18c. A first region within the PCI address space is reserved by the operating system for programmable I/O operations that are performed by processors 11a-11n to read or change the contents of PCI device registers within PCI devices connected to PCI adapters 18a-18c. In addition, a second region within the PCI address space is allocated by the operating system for DMA accesses to system memory 16 by PCI devices connected to PCI adapters 18a-18c. Each of PCI devices connected to PCI adapters 18a-18e can use the mapped addresses to perform DMA Read or DMA Write operations by directly reading and writing in the PCI address space with the mapped addresses.

As such, a PCI device connected one of PCI adapters 18a-18e is able to transfer data via a DMA Write operation to system memory 16 through I/O controller 19. If the DMA Write operation is going to be performed on a location within system memory 16 having data that are shared by one or more of cache memories 12a-12n, the DMA Write operation must invalidate any copies of the data from those cache memories before completing the DMA Write operation in order to maintain data coherence.

Figure 2A:
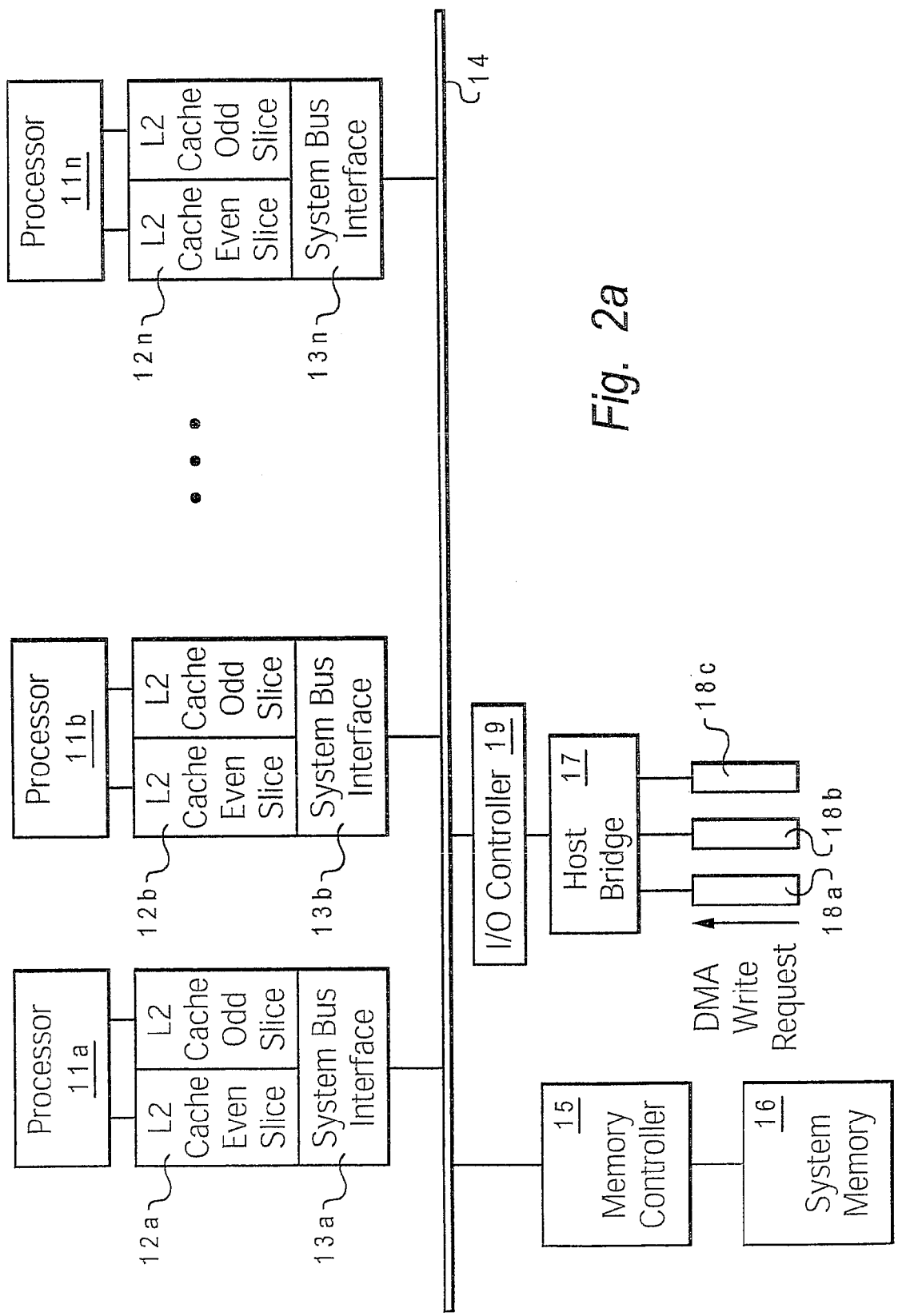
FIGS. 2a-2d graphically illustrate a method for invalidating cache lines during a DMA Write operation by a PCI device within the multiprocessor system from FIG. 1, in accordance with a preferred embodiment of the present invention.

With reference now to FIGS. 2a-2d, there are graphically illustrated a method for invalidating cache lines during a DMA Write operation by a PCI device within multiprocessor system 10, in accordance with a preferred embodiment of the present invention. First, a PCI device connected to one of PCI adapters 18a-18c generates a multi-cache line DMA Write request, and the multi-cache line DMA Write request is then sent to I/O controller 19. The number of cache lines in one multi-cache line DMA Write request preferably depends on the cache memory architecture. For example, when a PCI device connected to PCI adapter 18a makes a multi-cache line DMA Write request, as shown in FIG. 2a, the number of cache lines in the multi-cache line DMA Write request from the PCI device connected to PCI adapter 18a is preferably two because each of L2 cache memories 12a-12n has two cache slices (i.e., two separate cache lines).

Figure 2B:
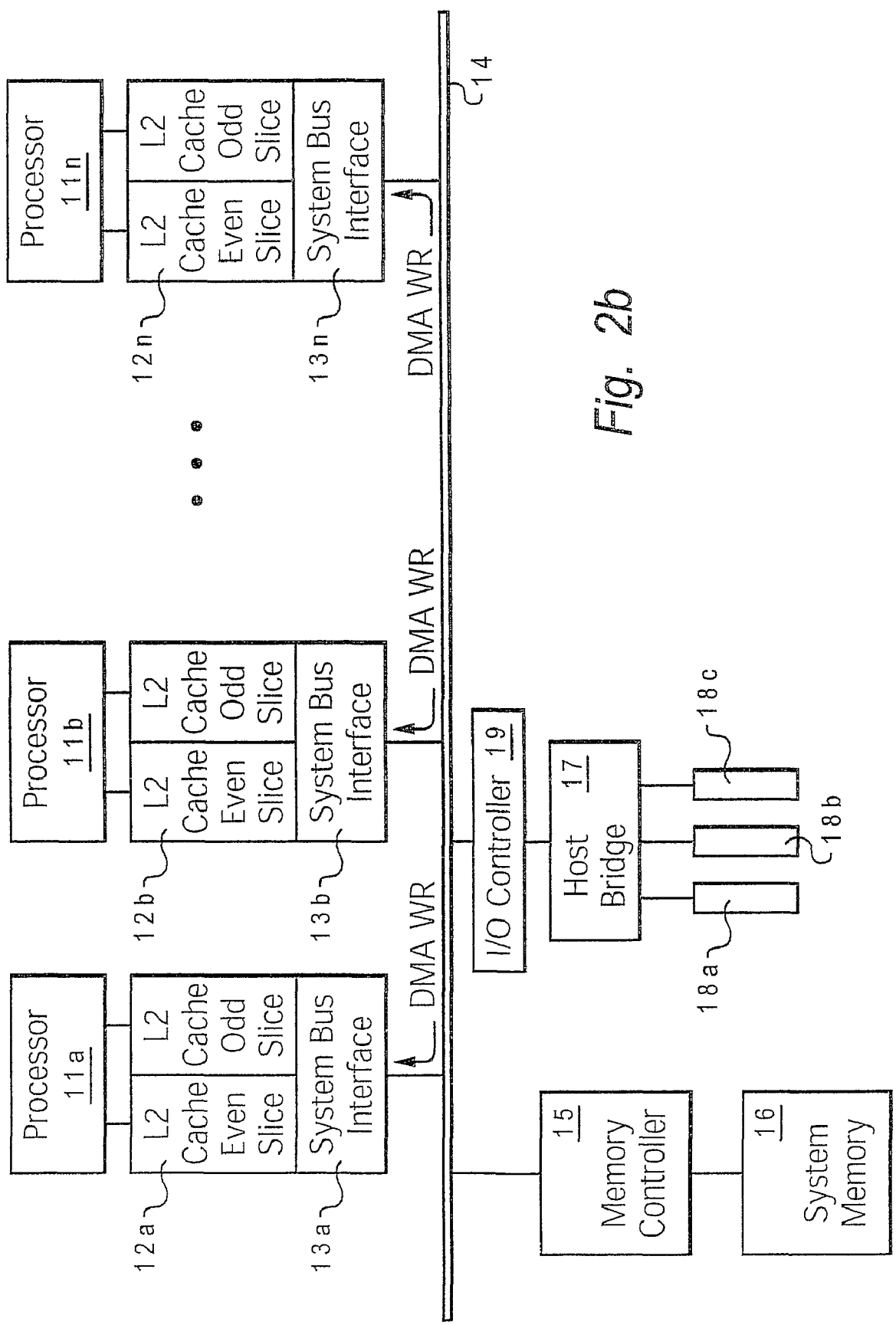

Next, I/O controller 19 sends the multi-cache DMA Write request to interconnect 14. The multi-cache line DMA Write request is then snooped by cache memories 12a-12n, as depicted in FIG. 2b. The multi-cache line DMA Write request is passed to both cache slices of each of L2 cache memories 12a-12n.

If, for example, L2 cache memory 12b has a copy of the data stored in the consecutive locations of system memory 16 to which the multi-cache line DMA Write request is directed, L2 cache memory 12b will invalidate the two cache lines that contains the copy of the data stored in the two consecutive locations of system memory 16.

Figure 2C:
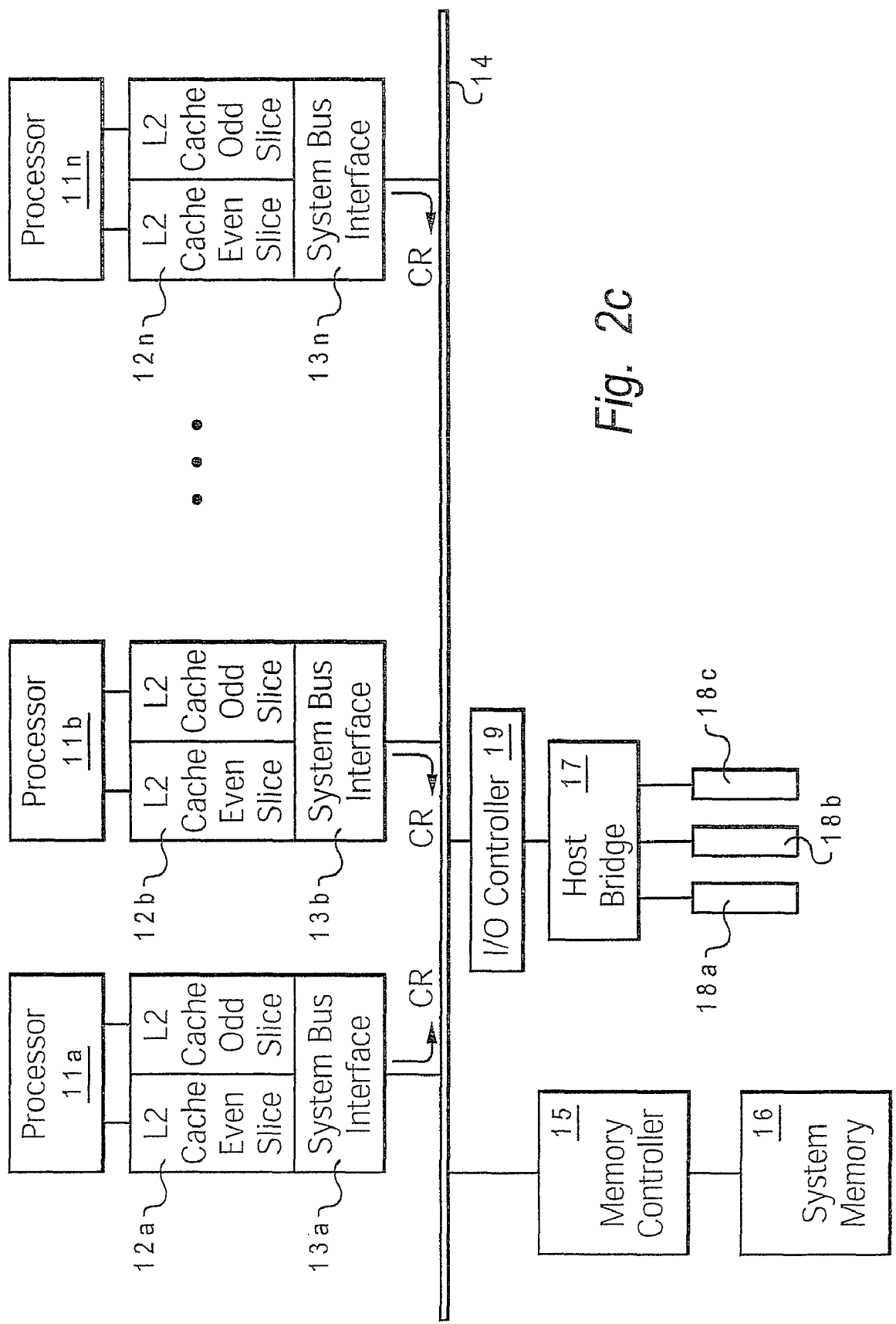

If none of L2 cache memories 12a-12n has a copy of the data stored in the consecutive locations of system memory 16 to which the multi-cache line DMA Write request is directed, each of the cache slices of L2 cache memories 12a-12n generates a separate coherence response. For each of the cache slices of L2 cache memories 12a-12n, the two coherence responses are then combined by a respective one of system bus interfaces 13a-13n to form a combined clean response, and all the combined clean responses are subsequently sent to interconnect 14, as shown in FIG. 2c.

Figure 2D:
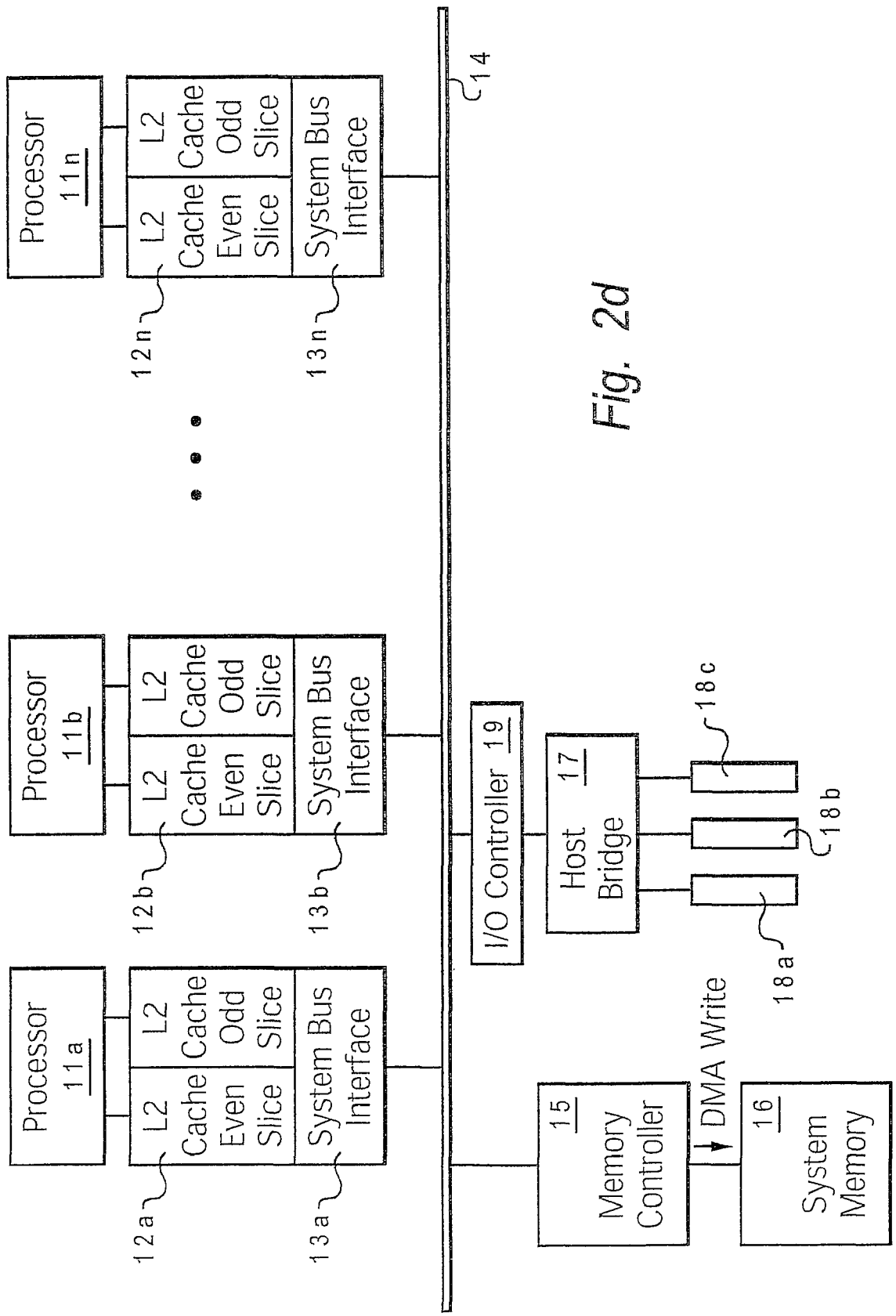

After snooping all the combined clean responses from L2 cache memories 12a-12n on interconnect 14, I/O controller 19 directs memory controller 15 to perform the DMA Write operation in system memory 16, as depicted in FIG. 2d.

During the DMA Write operation, memory controller 15 allows two cache lines's worth of data to be written to system memory 16 by using a Page mode access because Page mode access saves power as compared to sequential non-Page mode accesses.

As has been described, the present invention provide an improved method and apparatus for invalidating cache lines during a DMA Write operation by a PCI device. Although a multi-line data prefetch request for two cache lines is used to illustrate the present invention, it is understood by those skilled in the art that the multi-line data prefetch request of the present invention can be extended to more than two cache lines, such as four or more cache lines.

It is also important to note that although the present invention has been described in the context of a fully functional computer system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or CD ROMs and transmission type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. An apparatus for invalidating cache lines during a direct memory access (DMA) Write operation by a peripheral device in a multiprocessor system, said apparatus comprising:

a peripheral device for issuing a multi-cache line DMA request, wherein said peripheral device is associated with a multiprocessor system having a plurality of processors;

a plurality of cache memories, each associated with one of said processors, for snooping said multi-cache line DMA request;

means for determining whether or not any of said cache memories includes a copy of data stored in a plurality of system memory locations to which said multi-cache line DMA request are directed;

means for, in response to a determination that one of said cache memories includes a copy of data stored in a plurality of system memory locations to which said multi-cache line DMA request are directed, consecutively invalidating a plurality of cache lines within said one of said cache memories, and means for, in response to a determination that none of said cache memories includes a copy of data stored in a plurality of system memory locations to which said multi-cache line DMA request are directed, generating a separate coherence response by each portion of each of said cache memories.

2. The apparatus of claim 1, wherein said apparatus further includes means for combining said separate coherence responses from each of said cache memories by an associated system bus interface.

3. The apparatus of claim 2, wherein said apparatus further includes a memory controller for performing a DMA Write operation.

4. The apparatus of claim 1, wherein said peripheral device is a Peripheral Component Interconnect (PCI) device.

5. A computer-readable storage medium having a computer program product for invalidating cache lines during a direct memory access (DMA) Write operation by a peripheral device in a multiprocessor system, said computer-readable storage medium comprising:
- computer program code for issuing a multi-cache line DMA request by a peripheral device associated with a multiprocessor system, wherein said multiprocessor system includes a plurality of processors, each having a cache memory;
- computer program code for snooping said multi-cache line DMA request by said cache memories;
- computer program code for determining whether or not any of said cache memories includes a copy of data stored in a plurality of system memory locations to which said multi-cache line DMA request are directed;
- computer program code for, in response to a determination that one of said cache memories includes a copy of data stored in a plurality of system memory locations to which said multi-cache line DMA request are directed, consecutively invalidating a plurality of cache lines within said one of said cache memories; and
- computer program code for, in response to a determination that none of said cache memories includes a copy of data stored in a plurality of system memory locations to which said multi-cache line DMA request are directed, for generating a separate coherence response by each portion of each of said cache memories.

6. The computer-readable storage medium of claim 5, wherein said computer program product further includes computer program code for combining said separate coherence responses from each of said cache memories by an associated system bus interface.

7. The computer-readable storage medium of claim 6, wherein said computer program product further includes computer program code for directing a memory controller to perform a DMA Write operation.

8. The computer-readable storage medium of claim 5, wherein said peripheral device is a Peripheral Component Interconnect (PCI) device.

* * * * *